(12) United States Patent
Lee

(10) Patent No.: US 8,141,143 B2
(45) Date of Patent: Mar. 20, 2012

(54) METHOD AND SYSTEM FOR PROVIDING REMOTE ACCESS TO RESOURCES IN A SECURE DATA CENTER OVER A NETWORK

(75) Inventor: Jaushin Lee, Saratoga, CA (US)

(73) Assignee: Imera Systems, Inc., San Jose, CA (US)

( * ) Notice: Subject to any disclaimer, the term of this patent is extended or adjusted under 35 U.S.C. 154(b) by 1229 days.

(21) Appl. No.: 11/755,736

(22) Filed: May 31, 2007

(65) Prior Publication Data

US 2008/0301794 A1    Dec. 4, 2008

(51) Int. Cl.
*G06F 9/00* (2006.01)
*G06F 15/16* (2006.01)
*G06F 17/00* (2006.01)

(52) U.S. Cl. ............... 726/12; 726/11; 726/15

(58) Field of Classification Search ............ 726/11–15; 705/51–56
See application file for complete search history.

(56) References Cited

U.S. PATENT DOCUMENTS

| | | | |
|---|---|---|---|
| 7,032,022 B1 | 4/2006 | Shanumgam et al. | |
| 7,661,131 B1* | 2/2010 | Shaw et al. | 726/15 |
| 2002/0138437 A1* | 9/2002 | Lewin et al. | 705/51 |
| 2003/0069958 A1 | 4/2003 | Jalava | |
| 2004/0230841 A1 | 11/2004 | Savini | |
| 2006/0029000 A1* | 2/2006 | Waldvogel | 370/254 |
| 2006/0075478 A1 | 4/2006 | Hyndman et al. | |
| 2006/0080441 A1 | 4/2006 | Chen et al. | |
| 2006/0085381 A1* | 4/2006 | Fugate et al. | 707/1 |

* cited by examiner

*Primary Examiner* — Edan Orgad
*Assistant Examiner* — Jahangir Kabir
(74) *Attorney, Agent, or Firm* — Dergosits & Noah LLP

(57) ABSTRACT

Methods, computer products, and systems are described for providing remote access to resources in a secure data center protected by at least one firewall. One method includes sending by an internal server within the secure data center a request to an external server outside of the secure data center to establish a secure data transport channel between the internal server and the external server. The request travels through at least one firewall protecting the secure data center and over a public network, a private network, and/or a second firewall. The internal server receives a reply to the request from the external server granting the request and confirming the establishment of the secure data transport channel. When a first message from the external server instructing the internal server to create a first data access point associated with a first session is received via the established secure data transport channel, the internal server instantiates the first data access point for the first session and visual data corresponding to the resources in the secure data center is sent from the first data access point to the external server via the secure data transport channel. The visual data is received by the external server and then sent to a first client associated with the first session so that the first client is provided visual access to the resources in the secure data center while the resources remain protected within the secure data center.

7 Claims, 10 Drawing Sheets

METHOD AND SYSTEM FOR PROVIDING REMOTE ACCESS TO RESOURCES IN A SECURE DATA CENTER OVER A NETWORK

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

BACKGROUND

Many business enterprises typically maintain sensitive digital resources, e.g., computers, confidential information, data, applications, etc., in secure data centers. An internal network of a secure data center is typically protected by at least one high security firewall, and access to the internal network, and to the sensitive resources coupled thereto, is restricted to authorized users and authorized client devices. Such authorized client devices are typically local clients, that is, they are directly coupled to the internal network inside the secure data center. Physical access to the local clients is controlled by physical means, e.g., locked doors and security personnel, and electronic access to the local clients is controlled by security software in the local clients that authenticate and/or authorize any user attempting to access the internal network. External access to the local clients and to the internal network is controlled by the high security firewalls. In a lock-down environment, direct external access is security sensitive and typically not allowed. The access from internal clients to external devices is selectively open.

Many large modern business enterprises have sales offices, business centers, secure data centers, and/or manufacturing sites distributed throughout the country and/or worldwide. In addition, employees of such enterprises are often mobile and not necessarily associated with an office or building controlled by the enterprise. For example, sales and service personnel regularly travel to and from customer sites, and may work from their respective residences. Some of these workers require access to the sensitive resources, and can be authorized to access such resources, but cannot physically access a local client that is connected to the internal network.

In such instances, the worker might be granted access to a virtual private network (VPN), which uses tunneling technology to establish a secure tunnel from the worker's remote client device to a VPN gateway, which is deployed to the edge of the data center and connected to the internal network. The deployment of such a VPN infrastructure is complicated, because the VPN tunnel must travel over a public network, such as the Internet, then traverse through the enterprise intranet, and finally reach the data center of interest. Once a VPN infrastructure is deployed, with access to the VPN, the worker can gain remote access to the internal network and send and receive TCP/IP network traffic. In effect, the worker's client device becomes a local client with full access to the internal network and the sensitive resources connected thereto.

Because traditional tunnel-based VPN technology provides virtually total network connectivity and access by remote users, serious security issues arise. For example, such unfettered access presents a potential risk of exposing proprietary information, weakening intrusion safeguards, and/or infecting the internal network with outside viruses. Of particular concern is the risk of "information leakage," which refers to the extraction and misappropriation of confidential data from the secure data center. Moreover, because the traffic traveling within a VPN tunnel is typically unmonitored, an authorized, but malicious, remote user can introduce harmful data to the internal network and/or extract and misappropriate sensitive data without being identified. Accordingly, some enterprises choose to limit VPN access to a particular subset of trusted employees. Other enterprises adopt other VPN solutions based on secure sockets layer (SSL) technology that improve security protection but are limited to a very small set of web based enterprise applications such as email, web pages, Windows folders, and so forth.

Because of the security concerns mentioned above, few organizations give VPN access to users not affiliated with the enterprise, e.g., partners, suppliers, contract workers and/or customers. Nevertheless, in today's climate of joint ventures, multi-enterprise/cross domain collaboration, and remote administration, access to sensitive resources within an enterprise's secure data center by non-enterprise users is essential. Requiring non-affiliated personnel to be physically connected to the internal network via a local client is not feasible when some users are located in another city, state, country or continent.

One approach to addressing this problem involves providing the end user with a view of the resource, thereby restricting the end user's ability to extract and insert data. For example, a presentation server developed by Citrix Systems, Inc., and based on a terminal services tool developed by Microsoft Corporation, allows an end user to use a client device to view, but not receive, the data within the secure data center. The end user can use the client device to submit control commands against the resources via the presentation server, but is not allowed to transmit data or executables stored on the client device. The presentation server returns visual data, e.g., pixel data, which when displayed, shows the result of the control command. The end user's client device effectively becomes a "thin client" with respect to the resources in the secure data center.

While this approach gives the end user access to the resources and protects the resources from misappropriation or corruption, it is not designed to provide access to end users who are not affiliated with the enterprise, across domains and through firewalls. In other words, this approach is an internal network solution and generally available only for users who have direct access to the presentation server, which is typically within the secure data center for security reasons. As stated above, most non-affiliated users and/or remote users will not have direct access to the internal network, let alone to the presentation server. In order to allow non-affiliated users or remote users to utilize this approach, the enterprise must implement additional security measures, which require complicated infrastructure work.

For example, in one known system, shown in FIG. 1, a secure data center 15 includes a portal client 17, a web server 18, and a presentation server 19 behind at least one enterprise firewall 16a, 16b, 16c in a perimeter network or DMZ. The portal client 17 can be a thin client that includes a web browser and an Independent Computing Architecture (ICA) client that allows the portal client 17 to communicate with the presentation server 19 via the web server 18. An internal user (not shown) can access the resources 54 in the secure data center 15 by launching a session on the portal client 17. Remote users/clients 12, however, generally cannot access the portal client 17 over the Internet 11 because the portal client 17 is behind the enterprise's external firewalls 16a. To address this, the remote client 12 is required to establish a VPN tunnel 20 over the Internet 11 to traverse the external firewalls 16a in order to reach the portal client 17.

While this approach is functional, it is not suitable for security-sensitive enterprises for several reasons. First, this approach requires providing VPN access to the remote client 12, which is generally undesirable when the remote client 12 and its user are not affiliated with the enterprise. Moreover, such a VPN based solution raises serious security concerns in many enterprise security practices because it requires opening ports in each firewall to allow access into the secure data center 15. Moreover, such a VPN based solution is relatively complicated to deploy because it requires configuring every remote client 12 and configuring or constraining the VPN gateway to limit the access for each remote client 12. This is not feasible for large enterprises which may have hundreds, if not thousands, of employees and partners around the world. In addition, current enterprise network environments require scalability and flexibility around data centers, and current VPN based solutions cannot provide these features.

Another disadvantage of current VPN based solutions is that the remote access to the secure resources 54 through the VPN gateway, portal client 17, and presentation server 19, typically is not monitored or recorded for auditing purposes. Such monitoring and recording is critical when non-affiliated users and/or remote users are granted remote access to the secure resources 54. Without such monitoring and auditing capabilities, security sensitive enterprises cannot determine who accessed the secure data center 15, which secure resources 54 were accessed, at what time such access was granted, and/or what commands were executed. Thus, for this additional reason, the current VPN based solutions are unsuitable for security sensitive enterprises.

Accordingly, there exists a need for methods, systems, and computer program products for providing remote access to resources in a secure data center over a network. The methods, systems and computer program products should provide monitoring and recording capabilities so that changes applied to the internal network and to the secure resources 54 can be recorded for auditing purposes.

SUMMARY

Methods and systems are described for providing remote access to resources in a secure data center protected by at least one firewall. One method includes sending by an internal server within the secure data center a request to an external server outside of the secure data center through the at least one firewall protecting the secure data center and at least one of a public network, a private network, and a second firewall, the request for establishing a secure data transport channel between the internal server and the external server, and receiving by the internal server a reply to the request from the external server, the reply granting the request and confirming the establishment of the secure data transport channel, wherein the secure data transport channel communicatively connects the internal server and the external server over at least one of the public network, the private network, and the second firewall and through the at least one firewall protecting the secure data center. When a first message from the external server instructing the internal server to create a first data access point associated with a first session is received via the established secure data transport channel, the internal server instantiates the first data access point for the first session and visual data corresponding to the resources in the secure data center is sent from the first data access point to the external server via the secure data transport channel. The visual data is received by the external server and then sent to a first client associated with the first session so that the first client is provided visual access to the resources in the secure data center while the resources remain protected within the secure data center.

In another aspect of the subject matter disclosed herein, another method for providing remote access to resources in at least one secure data center protected by at least one firewall includes receiving by an external server over one of a public network and a private network a first request from a first internal server within a first secure data center, the first request including a request to establish a secure data transport channel between the first internal server and the external server and sending by the external server a reply to the first request, the reply confirming the establishment of the secure data transport channel. When a first message including a session request to establish a first session for accessing resources in the first secure data center is received by the external server from a first client, the first session is created and an instruction directing the first internal server to create a first data access point for the first session is sent to the first internal server via the established secure data transport channel. Visual data associated with the first session and corresponding to the resources in the first secure data center is received by the external server via the secure data transport channel and sent to the first client so that the first client is provided visual access to the resources in the first secure data center while the resources remain protected within the first secure data center.

In another aspect of the subject matter disclosed herein, a method for providing access to resources in a secure data center protected by at least one firewall during a collaboration session between at least two clients, where at least one of the at least two clients is authorized to access the resources in the secure data center is described. The method includes establishing a secure data transport channel that communicatively connects an internal access server within the secure data center and a first collaboration server outside of the secure data center over one of a public and a private network and through at least one firewall protecting the first secure data center. The first collaboration server receives a message for a first client associated with the first collaboration server. The message, sent from a second collaboration server, includes an invitation for the first client to engage in a collaboration session with a second client associated with the second collaboration server. The first and second collaboration servers can be associated with first and second enterprises, respectively. The first collaboration server establishes an interactive collaboration session between the first and second clients using at least one of the first and second collaboration servers. The method also includes receiving by the first collaboration server a request from the first client to establish a session to access the resources in the secure data center, where the first client is authorized to access the resources. The session is created and an instruction directing the internal access server to create a data access point for the session is sent to the internal access server via the established secure data transport channel. The first collaboration server receives visual data associated with the session and corresponding to the resources in the secure data center via the secure data transport channel, and sends the visual data associated with the session to the first client so that the visual data can be displayed by the first client and shared with the second client via the interactive collaboration session. The first and second clients are provided visual access to the resources in the secure data center while the resources remain protected within the first secure data center.

In another aspect of the subject matter disclosed herein, a system for providing remote access to resources in a secure data center protected by at least one firewall includes an internal server within the secure data center communicatively connected to a plurality of resources via a secure internal network and an external server outside of the secure data center accessible by a remote client over one of a public network and a private network. The internal server is configured for sending a request to the external server for establishing a secure data transport channel between the internal server and the external server through the at least one firewall protecting the secure data center and at least one of a public network, a private network, and a second firewall. The internal server is further configured for receiving a reply to the request from the external server, the reply granting the request and confirming the establishment of the secure data transport channel, for receiving a first message from the external server via the established secure data transport channel, the first message including an instruction to create a first data access point for a first session, for instantiating the first data access point for the first session in response to receiving the first message, and for sending from the first data access point visual data corresponding to the resources in the secure data center to the external server via the secure data transport channel. The external server is configured for receiving the request for establishing the secure data transport channel, for sending the reply confirming the establishment of the secure data transport channel, for receiving a message from the first client, the message including a session request to establish a first session for accessing resources in the secure data center, for creating the first session and sending to the internal server via the established secure data transport channel the instruction directing the internal server to create the first data access point for the first session, for receiving the visual data associated with the first session and corresponding to the resources in the secure data center via the secure data transport channel, and for sending the visual data associated with the first session to the first client so that the first client is provided visual access to the resources in the secure data center while the resources remain protected within the secure data center.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

Methods, systems, and computer program products for providing remote access to resources in a secure data center over a network are disclosed. In this description, a secure resource refers to any network accessible resource. For example, resources in a secure data center can include computer systems, work stations, data servers, data, software and hardware components and web servers. According to one embodiment, a secure data center includes an internal server residing within the center's secure internal network behind at least one enterprise firewall. The internal server is coupled to the secure internal network and has access to the secured resources in the data center. In one embodiment, the internal server automatically initiates and establishes a secure data transport channel with an external server located outside of the center's secure internal network. Notably, the establishment of the secure data transport channel between the external server and the internal server does not require other network infrastructure solutions or security measurements or adjustments, e.g., a VPN or web server overlay, for security bypass or network infrastructure traversal. The external server, in one embodiment, is configured to receive requests from remote clients to access the resources in the secure data center and to manage such access via the secure data transport channel and the internal server.

In one embodiment, the internal server transmits pixel data corresponding to the resource over the secure data transport channel to the external server, which then routes the pixel data to the remote client so that the remote client can have visual access to the resource in the secure data center. The secure data transport channel, in one embodiment, can be configured to support only pixel data from the internal server and simple control commands from the remote client. In this manner, the remote client can display the resource, but cannot transfer data into or transfer data out of the secure data center. In essence, the remote client becomes a thin client with respect to the data center. Accordingly, the data center is protected from malicious attacks from the remote client and, because the resource always remains within the data center, the opportunities for misappropriation are reduced.

Figure 1:
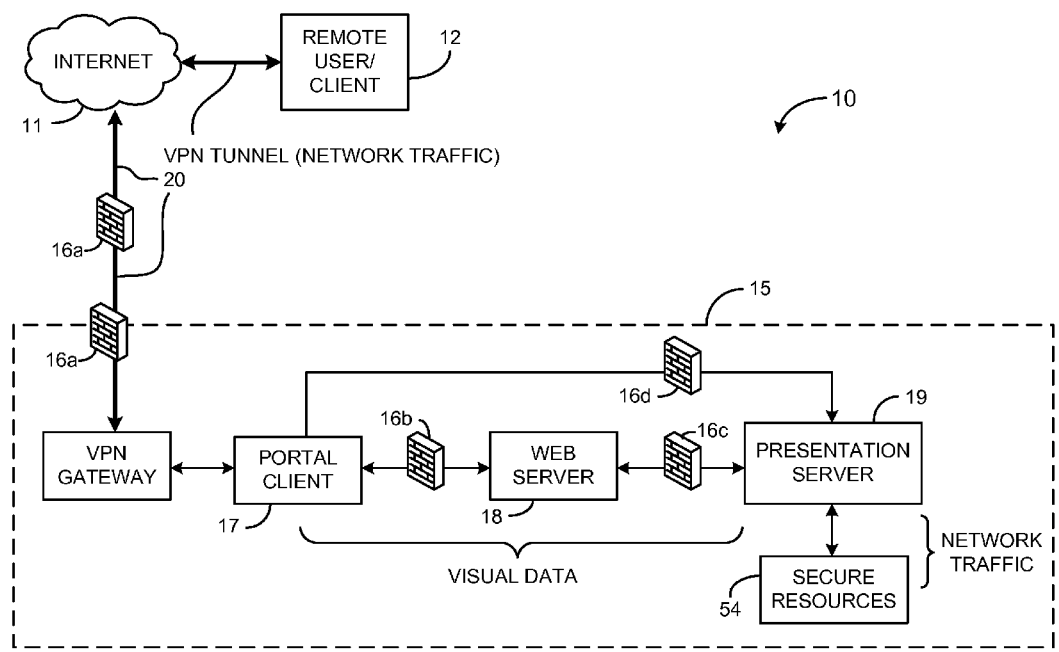
FIG. 1 is a block diagram illustrating a prior art system for remotely accessing data in a data center.
Figure 2:
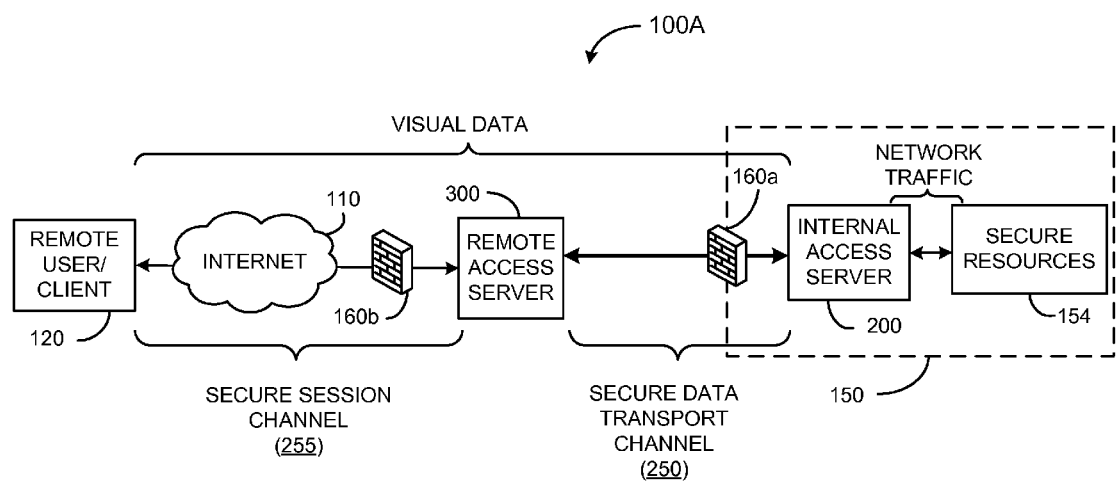
FIG. 2 is a block diagram illustrating an exemplary system for providing remote access to resources in a secure data center over a network according to an exemplary embodiment.

FIG. 2 is a block diagram illustrating an exemplary system for providing remote access to resources in a secure data center over a network according to one embodiment. The secure data center 150 includes a plurality of secure resources 154 and an internal server 200 communicatively coupled to the secure resources 154 via a secure internal network. The internal server 200, referred to here as an internal access server, the secure resources 154 and the internal network are protected by at least one firewall 160a. The secure internal network supports common network protocols such as, for example, TCP/IP communication protocols.

According to an exemplary embodiment, the internal access server 200 is configured to send and receive information to and from an external server 300, referred to here as a remote access server, over a secure data transport channel

250. The remote access server 300 resides outside of the firewalls 160*a* protecting the secure data center 150 and can be in one of a perimeter network surrounding the secure data center 150, a perimeter network on the edge of the enterprise private network (not shown), and the Internet 110. According to one embodiment, the remote access server 300 can be accessed over the internet 110 by a remote user/client 120, and can also be protected by at least one firewall 160*b*. In one embodiment, the user uses a network enabled client device to send and receive information over the internet 110 and/or a private network (not shown). The client device can be a desktop or laptop computer, a smart phone, a PDA, and the like. In this description, the term "user" and "client" can be used interchangeably to identify the person or device that is attempting to send or receive information over the network.

Figure 3:
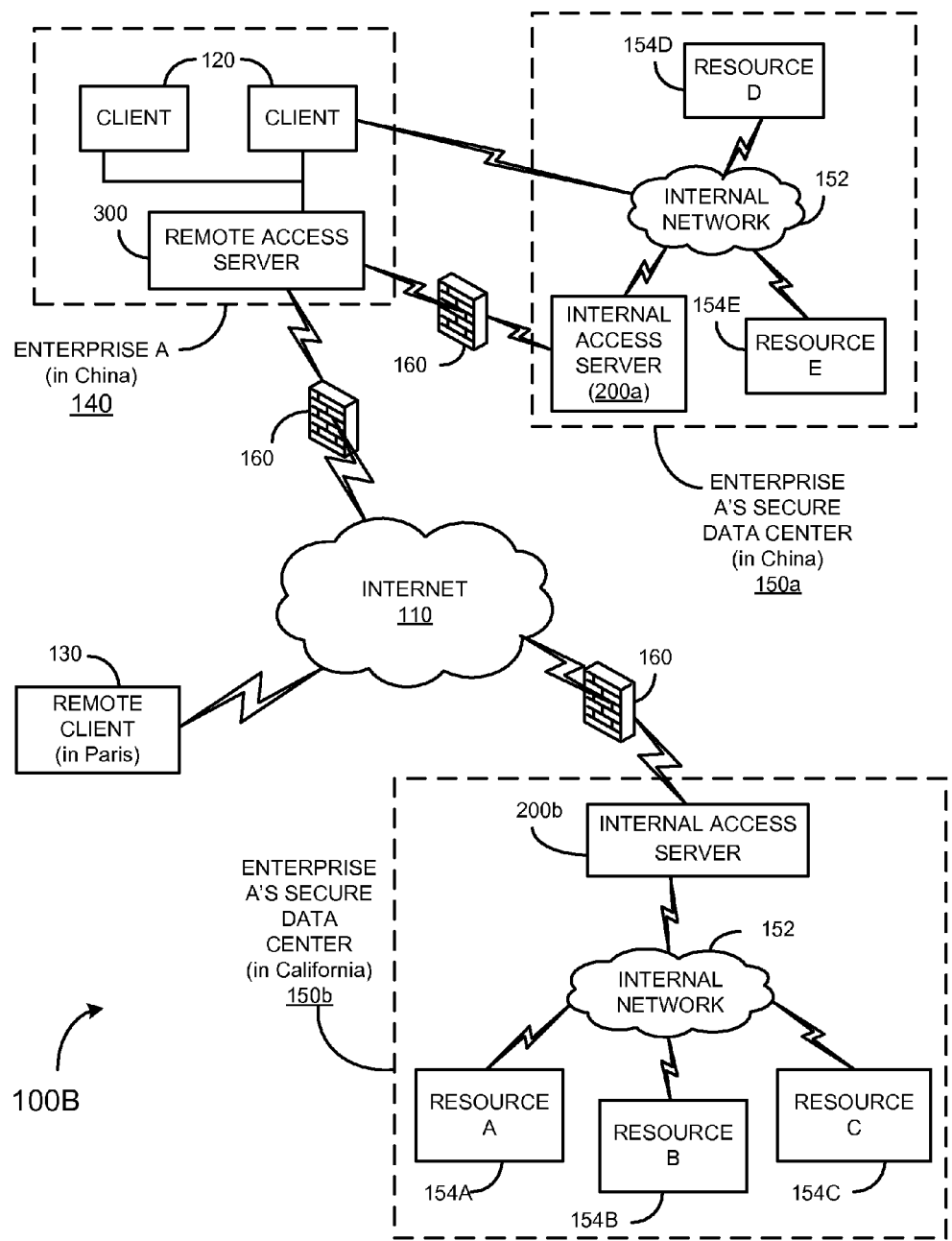
FIG. 3 is a block diagram illustrating an exemplary system for providing remote access to resources in a secure data center over a network according to another exemplary embodiment.

The remote access server 300 and the internal access server 200 within the secure data center 150 can be communicatively coupled to one another directly via a private network, as shown in FIG. 2, or via the Internet 110, as shown in FIG. 3, which is a block diagram illustrating another exemplary system 100B for providing remote access to resources 154 in a secure data center 150*a*, 150*b* over a network 110 according to another embodiment. In the embodiment shown in FIG. 3, a remote access server 300 in an enterprise 140, Enterprise A, located in China, can manage remote access to a secure data center in China 150*a* by a remote client in Paris 130 and to a secure data center in California 150*b* by a remote client in China 120. While the client 120 in China can be an internal client with respect to the secure data center in China 150*a*, and as such, can access directly the resources 154D, 154E therein, the same client 120 is a remote client with respect to the secure data center in California 150*b*. As such, access to the secure data center in California 150*b* is managed through the remote access server 300.

Figure 4:
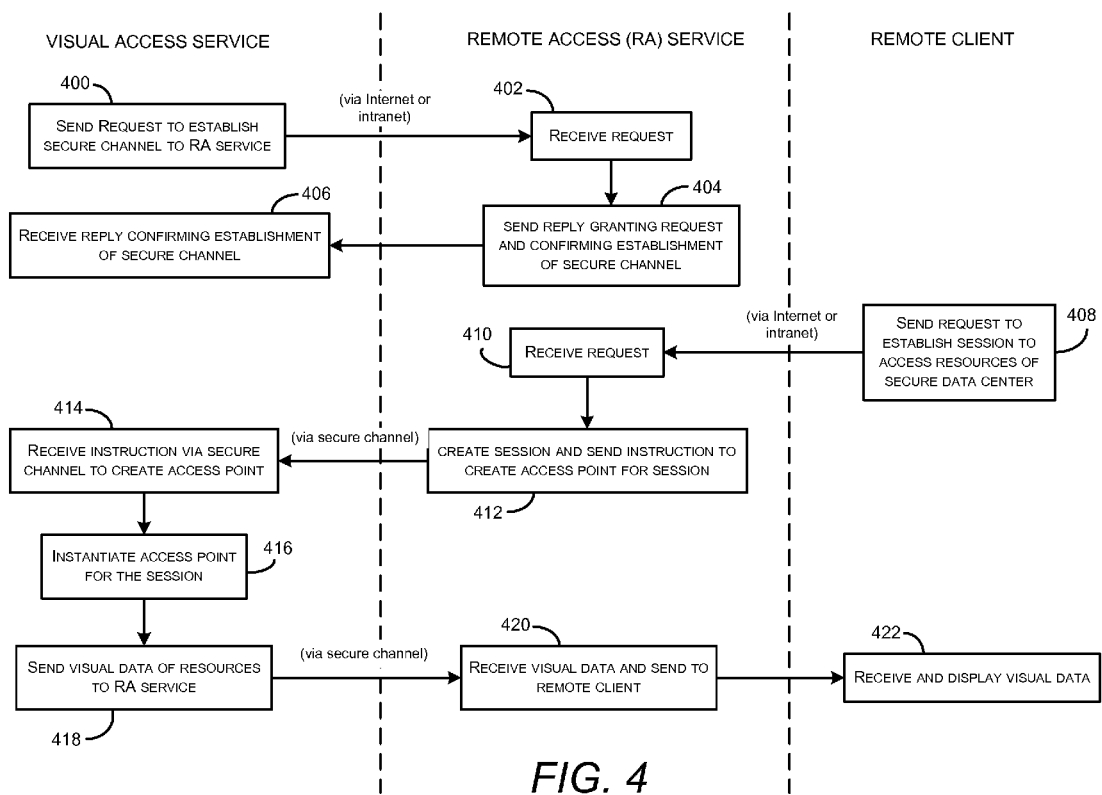
FIG. 4 is a flowchart illustrating an exemplary method for providing remote access to resources in a secure data center over a network according to one embodiment.

FIG. 4 is a flowchart illustrating an exemplary method for providing remote access to resources 154 in a secure data center 150 over a network 110 according to one embodiment. Referring to FIGS. 2, 3 and 4, the process begins when the internal access server 200 sends a request to the remote access (RA) server 300 outside of the secure data center 150 to establish a secure data transport channel 250 between the internal access server 200 and the RA server 300 (block 400). In one embodiment, the request is sent from the internal access server 200 through the firewalls 160*a* protecting the secure data center 150 and through at least one of a private network, a public network, such as the Internet 110, and a second firewall 160*b* protecting the RA server 300.

Figure 5:
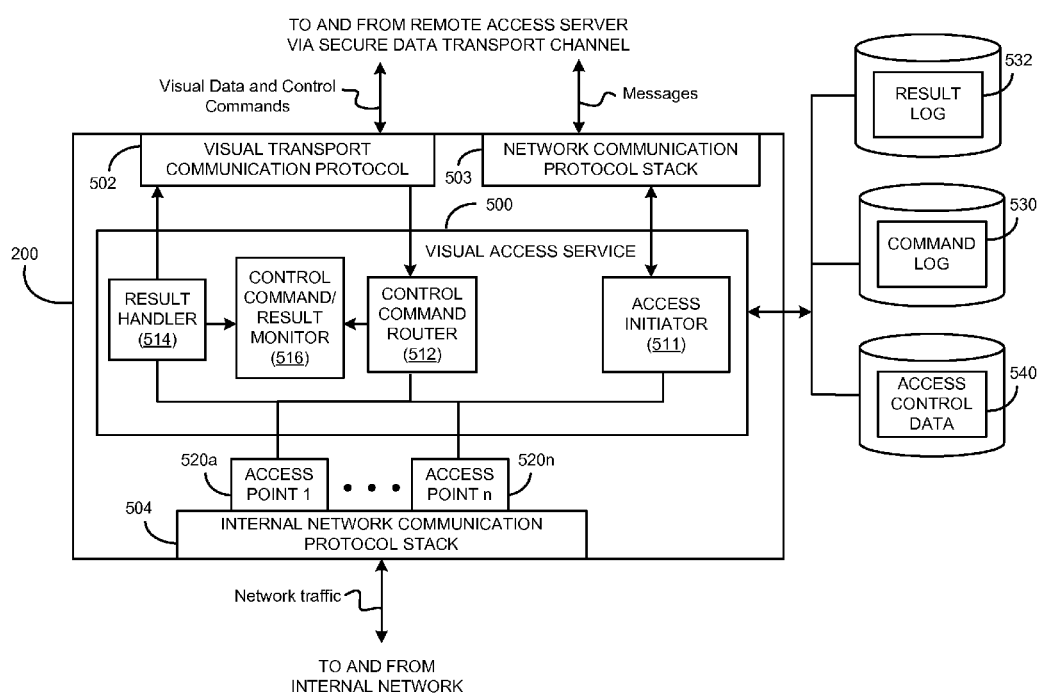
FIG. 5 is a block diagram of an exemplary access server according to one embodiment.

FIG. 5 is a block diagram of an exemplary internal access server 200 according to one embodiment. In this embodiment, the internal access server 200 includes a visual access service 500 that is configured to manage access to the secure resources 154 in the secure data center 150. The visual access service 500 can include an access initiator component 511 that is configured to locate the RA server 300, and to generate and send the request to the RA server 300 through the firewalls 160*a*, 160*b* and over the Internet 110 or private network via a network communication protocol stack 503. In one embodiment, the information identifying the RA server 300 can be retrieved from a data store that stores access control data 540. Accordingly, a security administrator (not shown) can easily control to which RA servers 300 the access initiator 511 sends a request. In one embodiment, the request from the access initiator 511 can include information identifying the internal access server 200 and other security information that allows the RA server 300 to authenticate the internal access server 200.

Figure 6:
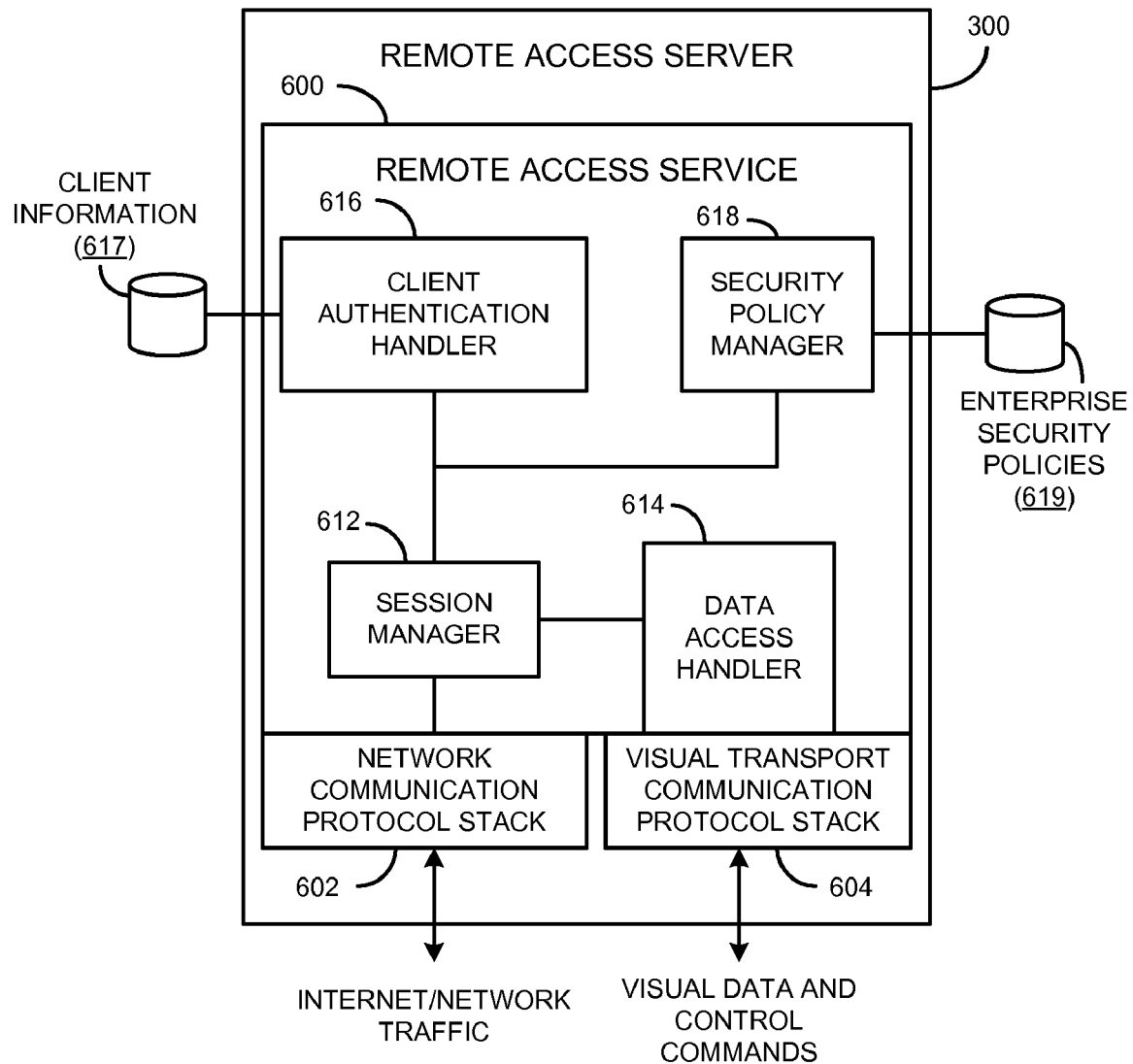
FIG. 6 is a block diagram of an exemplary remote access server according to one embodiment.

Referring again to FIG. 4, the RA server 300 receives the request via the Internet 110 or private network (block 402). FIG. 6 is a block diagram of an exemplary RA server 300 according to one embodiment. The RA server 300 includes a remote access (RA) service 600 for managing a remote client's access to the secure resources 154 in the secure data center 150. In one embodiment, when the RA service 600 receives the request from the visual access service 500, a common security handshake process is performed between the RA service 600 and the visual access service 500. For example, the RA service 600 can include a session manager component 612 that receives the request over the network, e.g., Internet 110 or private, via a network communication protocol stack 602, authenticates the internal access server 200 and visual access service 500, replies to the visual access service 500 by sending information that allows the visual access service 500 to authenticate the RA service 600, and receives and sends encryption information, e.g., public keys, to the visual access service 500.

Once the handshake process is completed, the session manager component 612 can, in one embodiment, instruct a data access handler component 614 in the remote access service 600 to establish the secure data transport channel 250. Once established, the secure data transport channel 250 is a persistent connection between the internal access server 200 and the RA server 300 in one embodiment. That is, the life of the channel 250 is not session-based and can be maintained to support several sessions simultaneously.

Referring again to FIG. 4, when the secure data transport channel 250 is established, the RA service 600 sends a reply to the visual access service 500 granting the request and confirming the establishment of the secure data transport channel 250, which communicatively connects the visual access service 500 and the RA service 600 over the Internet 110 or the private network and through the firewalls 160*a* protecting the secure data center 150 (block 404). In one embodiment, the secure data transport channel 250 supports Secure Sockets Layer (SSL) based visual transport protocols and allows only visual data and basic control commands to be transmitted between the RA server 300 and internal access server 200. In another embodiment, the secure data transport channel 250 can allow other types of data to be transmitted, such as static computer files or data base files, dynamic datagram or command streams generated by specifically allowed application software or client-server tools. The visual access service 500 receives the reply (block 406), and waits for further instructions from the RA service 600.

According to one embodiment, the method continues when a remote client, e.g., 130, sends a request to the RA service 600 to establish a session for accessing secure resources 154 in the secure data center 150 (block 408). The RA service 600 receives the session request from the remote client 130 (block 410) and processes the request. For example, referring to FIG. 6, the session manager component 612 can, in one embodiment, receive the session request from the remote client 130 over the Internet 110 via the network communication protocol stack 602. The session manager component 612 can call a client authentication handler component 616 to authenticate the remote client 130. In one embodiment, client information 617, including authentication information, associated with the remote client 130 can be stored locally, as shown, or on a different server and retrieved by the client authentication handler component 616.

In addition and/or in the alternative, the session manager component 612 can call a security policy manager component 618 to check security policies of the enterprise 619 associated with the secure data center 150 to determine whether the remote client 130 is authorized to access the secure resources 154. The security policies 619 can be based on at least one of the remote user, the remote client 130 and a characteristic of the user or remote client 130, i.e., a role-based security policy. For example, a security policy can grant independent contractors limited access to certain resources 154, whereas another security policy can grant senior vice presidents of the enterprise unlimited access to the resources 154. The security policies of the enterprise 619 can be stored locally, as shown, or on a different server. In either embodiment, the enterprise's security policies 619 can be enforced at a single-point of entry, thereby simplifying security implementation.

Referring again to FIG. 4, once the remote client 130 is authenticated and authorized, the session manager component 612 can, in one embodiment, create the session and direct the data access handler component 614 to send an instruction to the visual access service 500 to create a data access point for the session (block 412). In one embodiment, the session manager component 614 can establish a secure session channel 255 between the RA service 600 and the remote client 130 and the data access handler component 614 can send the instruction to the visual access service 500 via the established secure data transport channel 250.

According to an exemplary embodiment, the visual access service 500 receives the instruction from the RA service 600 (block 414) via the secure data transport channel 250 and instantiates a data access point, e.g., 520a, for the session associated with the remote client 130 (block 416). For example, referring to FIG. 5, the access initiator 511 can receive the instruction and can instantiate the data access point 520a for the session associated with the remote client 130. According to one embodiment, the access initiator 511 can retrieve from the access control data 540 a profile corresponding to the remote client 130, which indicates to which secured resources 154 the remote client 130 can have access. The retrieved profile can be used to configure the data access point 520a for the remote client 130. In some embodiments, when the access initiator 511 instantiates the data access point 520a, it returns information identifying the data access point, e.g., an access point identifier (ID), to the RA service 600 so that the data access point can be associated with the session. In other embodiments, the RA service 600 can provide the access point ID to the visual access service 500.

Referring again to FIG. 4, once the data access point 520a for the remote client 130 is instantiated, visual data corresponding to the resources 154 to which the remote client 130 is authorized to access is sent from the data access point 520a to the RA service 600 via the secure data transport channel 250 (block 418). In one embodiment, the visual data, and optionally the access point ID, is sent to the RA service 600 using a visual transport communication protocol stack 502 (FIG. 5).

The visual data is received by the RA service 600 and sent to the remote client 130 (block 420), where it is received and displayed on the remote client 130 to the user (block 422). For example, in one embodiment, the data access handler component 614 can receive the visual data from the access data point 520a and can determine with which session the visual data is associated based on the access point ID included with the visual data. Once the session is determined, the data access handler component 614 can, in one embodiment, send the visual data to the remote client 130 associated with the session over the secure session channel 255 using the visual transport communication protocol stack 604. In this manner, the remote client 130 is provided visual access to the resources 154 in the secure data center 150 while the resources 154 remain protected within the secure data center 150.

Once the visual data corresponding to the resources 154 to which the remote client 130 is authorized to access is displayed on the remote client 130, the user can issue control commands, such as mouse actions and key strokes, to access the resources 154. In essence, the remote client 130 becomes a thin client with respect to the secure data center 150 because the remote client 130 can receive only visual data and can only send control commands.

Figure 7:
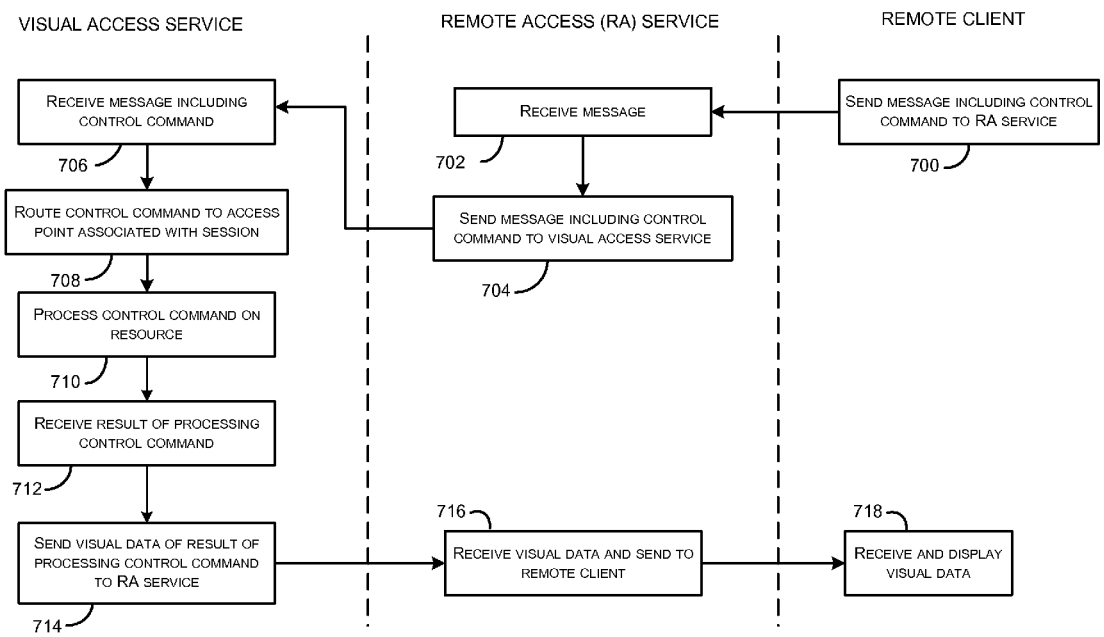
FIG. 7 is a flowchart illustrating an exemplary process for providing remote access to resources in a secure data center over a network according to another embodiment.

FIG. 7 is a flowchart illustrating an exemplary process for providing remote access to resources 154 in a secure data center 150 over a network 110 according to another embodiment. In this embodiment, the remote client 130 can send a message that includes a control command to the RA service 600 (block 700). The control command can be a key stroke, a mouse action, e.g., right-click or left-click on an icon, a voice command or any other command submitted by the user via the client device. For example, the user can move the mouse to place a pointer on a displayed icon corresponding to a resource in the secure data center 150 and then double-click on the icon to send a message that includes a control command to open the resource.

In one embodiment, the message including the control command is received by the RA service 600 (block 702) over the secure session channel 255. For example, the data access handler component 614 can receive the message from the remote client 130 via the visual transport communication protocol stack 604. In addition to the control command, the message can include information identifying the session and, optionally, information identifying the remote client 130. Using this information, the data access handler component 614 can determine with which data access point 520a the session and remote client 130 are associated. The control command is then sent to the visual access service 500 over the secure data transport channel 250 (block 704) using the visual transport communication protocol stack 604.

According to one embodiment, the visual access service 500 receives the message including the control command (block 706) via the visual transport communication protocol stack 502 and the control command is routed to the data access point 520a associated with the session (block 708). For example, in one embodiment, the visual access service 500 can include a control command router 512 configured for receiving the message including the control command and for routing the control command to the data access point 520a associated with the session. In an exemplary embodiment, the control command router 512 also can pass the control command to a control command/result monitor component 516, which records the control command in an activity/command log 530 and stores the log 530 in a data store for auditing purposes. In this manner, every key stroke and mouse action can be recorded and analyzed to determine access patterns, abuse or other activities.

When the data access point 520a receives the control command, it is configured to process the control command on the resource 154 (block 710). In one embodiment, the data access point 520a can create and send an instruction based on the control command to the resource 154 via the secure internal network 152 (FIG. 3) using the internal network communication protocol stack 504. For example, when the control command is to retrieve data from a specified database server in the secure data center 150, the data access point 520a is configured to create an instruction that can include the control command and/or some form of the control command, which when executed against the specified database server, returns the data of interest. In one embodiment, the data access point 520a serves as a virtual computer system inside of the secure data center 150 that accepts and executes the remote user's control commands as if the remote user were physically inside of the data center 150 and using the computer system to access the secure resources 154 therein.

According to an exemplary embodiment, the result of the processing of the control command is received by the data access point 520a (block 712). As stated above, the resources 154 and the data access point 520a are communicatively connected via the secure internal network 152, which supports network traffic using an internal network communication protocol, such as a TCP/IP communication protocol. In one embodiment, the network traffic flows within the secured data center 150, but terminates at the data access point 520a, i.e., does not flow out from the data access point 520a to the RA service 600, as is shown in FIG. 2.

Rather, in one embodiment, the data access point 520a sends the visual pixel data corresponding to the result to the RA service 600 (block 714), and optionally the access point ID, over the secure data transport channel 250 via the visual access service 500. For example, when the control command is to open a folder, the result of the processing of the control command can display a window including a list of files that are stored in the folder.

In one embodiment, the visual access service 500 includes a result handler component 514 that receives the visual pixel data corresponding to the result from the data access point 520a, and prepares it for transmission over the secure data transport channel 250. In addition, the result handler component 514 can pass the visual pixel data corresponding to the result to the control command/result monitor component 516, which records the result in a result log 532 and stores the log 532 in the data store for auditing purposes. In this manner, every result returned to a remote client, as well as every key stroke and mouse action, can be recorded and analyzed to determine access patterns, abuse or other activities.

The visual data is received by the RA service 600 and sent to the remote client 130 (block 716), where it is received and displayed on the remote client 130 to the user (block 718). For example, as described above, the data access handler component 614 can receive the visual data from the access data point 520a and can determine with which session the visual data is associated based on the access point ID included with the visual data. Once the session is determined, the data access handler component 614 can, in one embodiment, send the visual data to the remote client 130 associated with the session. The visual data is sent over the secure session channel 255 using the visual transport communication protocol stack 604.

According to aspects of the embodiments described, a secure data transport channel 250 communicatively connects the RA server 300 outside of the secure data center 150 and the internal access server 200 inside of the secure data center 150 over the Internet 110 or a private network and through at least one firewall 160a protecting the secure data center 150. The secure data transport channel 250, in one embodiment, supports a visual data transport communication protocol so that visual pixel data corresponding to the secure resources 154 within the secure data center 150 can be sent from the internal access server 200 to the remote access server 300. The visual pixel data received from the internal access server 200 can be sent to the remote client 120, 130 that establishes a session with the remote access server 300.

In exemplary embodiments, the remote client 120, 130 has visual access to the secure resources 154, such as applications and data, within the secure data center 150 without establishing a VPN tunnel into the secure data center 150. While the remote user can view and remotely utilize the secure resources 154, i.e., submit control commands, the remote user cannot transfer data into or out of the secure data center 150. Thus, unlike VPN based solutions, the secure data center 150 is protected from malicious attacks from the remote client 120, 130. Moreover, information leakage concerns are minimized because the data stays within the secure data center 150. Unlike conventional terminal service-based solutions, e.g., using a presentation server, the remote client 120, 130 is able to access the secure resources 154 over the Internet 110 and through firewalls 160a protecting the secure data center 150 without implementing VPN technology or any web service overlay solution.

In one embodiment, the RA service 600 can support a plurality of access sessions associated with a plurality of remote clients 120, 130, and the visual access service 500 can instantiate a plurality of data access points 520a-520n associated with the plurality of sessions. For example, the RA service 600 can receive a message from a second client, e.g., 120, that includes a request to establish a second session for accessing the resources 154 in the secure data center 150. In response, the session manager component 612 can create the second session and direct the data access handler component 614 to send a message to the visual access service 500 that includes an instruction to create a second data access point associated with the second session. The visual access service 500 can receive the message from the RA service 600 and instantiate the second data access point 520n. Visual data corresponding to the resources 154 can be sent from the second data access point 520n to the second remote client 103 via the secure data transport channel 250, the RA service 600 and a secure session channel 255 associated with the second session.

In other embodiments, more than one remote client 120, 130 can be associated with a single session and data access point 520a. For example, suppose a first remote client 120 is associated with a first session and a first data access point 520a. In one embodiment, the RA service 600 can receive a message from a second remote client 130 that includes a request to join the first session. After authenticating and authorizing the second remote client 130, and optionally receiving the approval of the first remote client 120, the session manager 612 can associate the second remote client 130 with the first session. A similar process can be applied when the first remote client 120 invites the second remote client 130 to join the first session. When the visual data is sent from the first data access point 520a to the RA service 600 via the secure data transport channel 250, the data access handler component 614 can send the visual data to all remote clients 120, 130 associated with the first session.

In another embodiment, the RA service 600 can establish a plurality of secure data transport channels 250 with a plurality of visual access services 500. For example, in one embodiment, one secure data center 150 can include a plurality of access servers 200 for purposes of load balancing and/or redundancy, and each internal access server 200 can be communicatively connected to the RA server 300 by a secure data transport channel 250. In another embodiment, the RA service 600 can provide visual access to a plurality of secure data centers 150a, 150b (FIG. 3). The secure data centers 150a, 150b can be affiliated with a common enterprise or each can be affiliated with a different enterprise. In the later case, the RA service 600 can store the securities policies of more than one enterprise and therefore, enforce different security policies for different secure data centers 150a, 150b.

In one embodiment, the remote client 120, the RA server 300, and the secure data centers 150a, 150b can be, in one embodiment, affiliated with a first enterprise such that the RA server 300 can serve as a single-point security policy enforcer for the first enterprise. In other embodiments, remote cross-domain access is also feasible and easily implemented. For example, a second remote client, e.g., 130, affiliated with a second enterprise can acquire visual access to sensitive data in the first enterprise's secure data center 150 so long as the second remote client is authorized to have such access, e.g., because the first and second enterprises have a partnership or other collaborative relationship.

In this embodiment, a second RA service 600 affiliated with the second enterprise can create a session for the second remote client 130 and send a message to the first RA service 600 including a session request for accessing the resources 154 in the first enterprise's secure data center 150. In response, the first RA service 600 can create the session and direct the visual access service 500 to create a data access point associated with the session and with the second remote client 130. The visual data from the data access point is received by the first RA service 600 and sent to the second remote client 130 via the second RA service 600.

Several exemplary embodiments described above demonstrate the scalability and flexibility provided by the methods and systems described herein. Those skilled in the art will readily recognize that other configurations can be easily implemented using the principles discussed herein. Accordingly, the subject matter disclosed is not intended to be limited only to the embodiments described.

Figure 8:
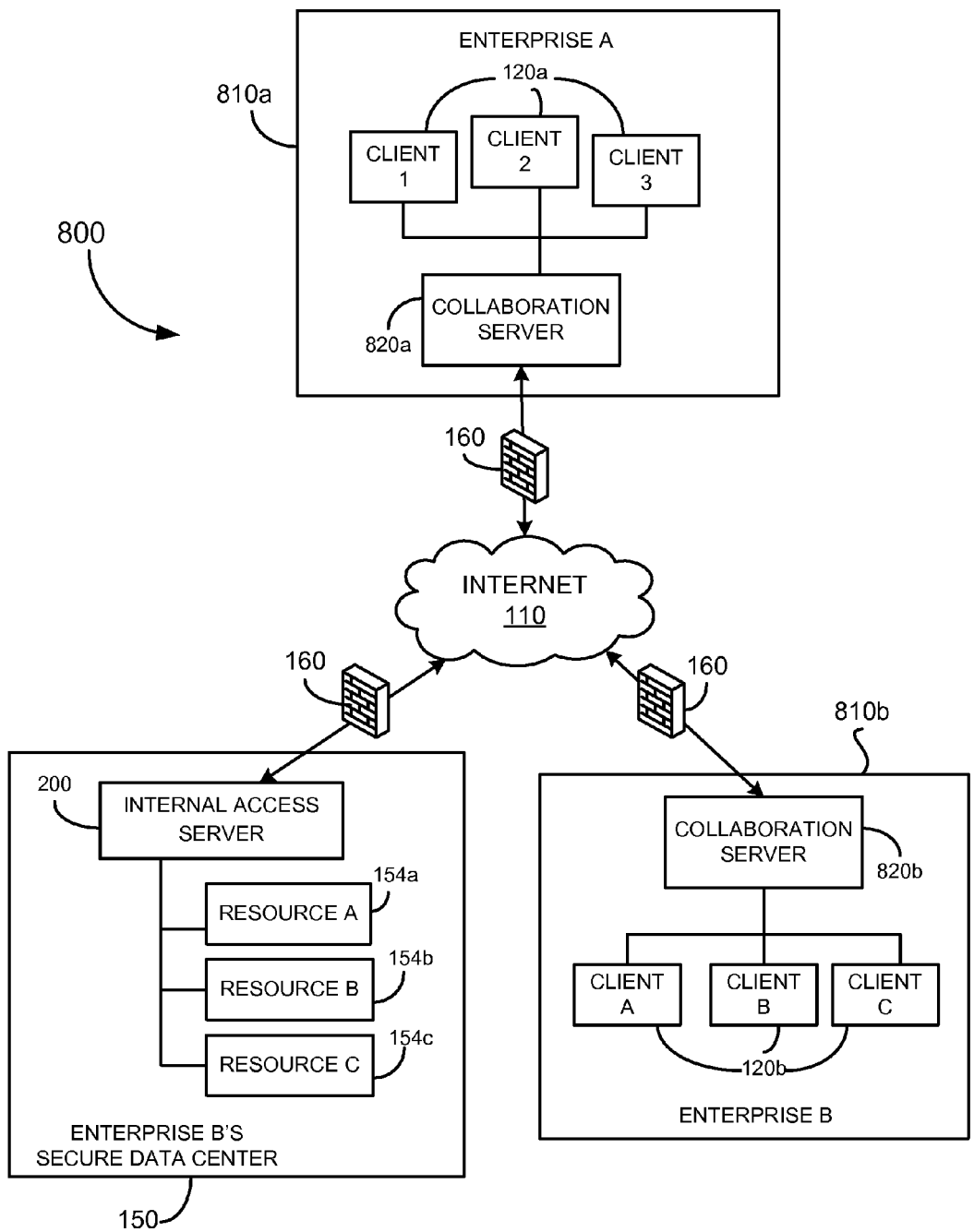
FIG. 8 is a block diagram illustrating an exemplary collaboration system that allows remote access to resources in a secure data center according to one embodiment.

For example, in another exemplary embodiment, the RA service 600 can be integrated with a collaboration system, such as that disclosed in co-pending U.S. application Ser. No. 11/141,767, entitled "DISTRIBUTED AND SCALABLE INSTANT MULTIMEDIA COMMUNICATION SYSTEM," filed on May 31, 2005 and assigned to the assignee of the present patent application. FIG. 8 is a block diagram illustrating an exemplary collaboration system that allows remote access to resources in a secure data center according to one embodiment. The collaboration system 800 can be a networked system including a plurality of autonomous collaboration networks 810a, 810b. Each network 810a, 810b can be hosted by an enterprise, which is typically protected by at least one firewall 160. In another embodiment, one enterprise can host more than one collaboration network 810a, 810b. For example, Enterprise A and Enterprise B can be subsidiaries or subdivisions of a single enterprise. Each collaboration network, e.g., 810a, is configured to communicate with other collaboration networks 810b over a public network, such as the Internet 110, or a private network, such as an intranet or LAN.

In an exemplary embodiment, each collaboration network, e.g., 810a, includes at least one collaboration server 820a that supports a plurality of clients 120a. Each client 120a is registered to a collaboration server, e.g., 820a, such that the server 820a is aware of each of its clients 120a, and can receive and provide information from and to each registered client 120a. In one embodiment, the collaboration network 810a can include a multi-point switching unit (not shown) that is configured to route information to a client 120a via its corresponding collaboration server 820a.

According to one embodiment, each collaboration server, e.g., 820a, in a collaboration network 810a is configured to communicate securely with other collaboration servers 820b in another network 810b, such that secure inter-network data exchange is facilitated. For example, presence information of a client in Enterprise A (120a) can be sent from a collaboration server in Enterprise A (820a) to a client in Enterprise B (120b) via the collaboration server in Enterprise B (820b). The secure inter-network communication can involve two or more collaboration networks 810a, 810b to form one collaboration session. Accordingly, enterprise-to-enterprise collaboration sessions can be facilitated without requiring an independent service provider outside of the firewalls 160.

According to an exemplary embodiment, secure resources 154a-154c in a secure data center 150 can be accessed and shared amongst the clients 120a, 120b in a collaboration session. In one embodiment, the RA service 600 described above can be integrated in at least one collaboration server, e.g., 820b, so that a remote client, e.g., 120a, can have visual access to a resource, e.g., 154a, in the secure data center 150 during the collaboration session.

Figure 9:
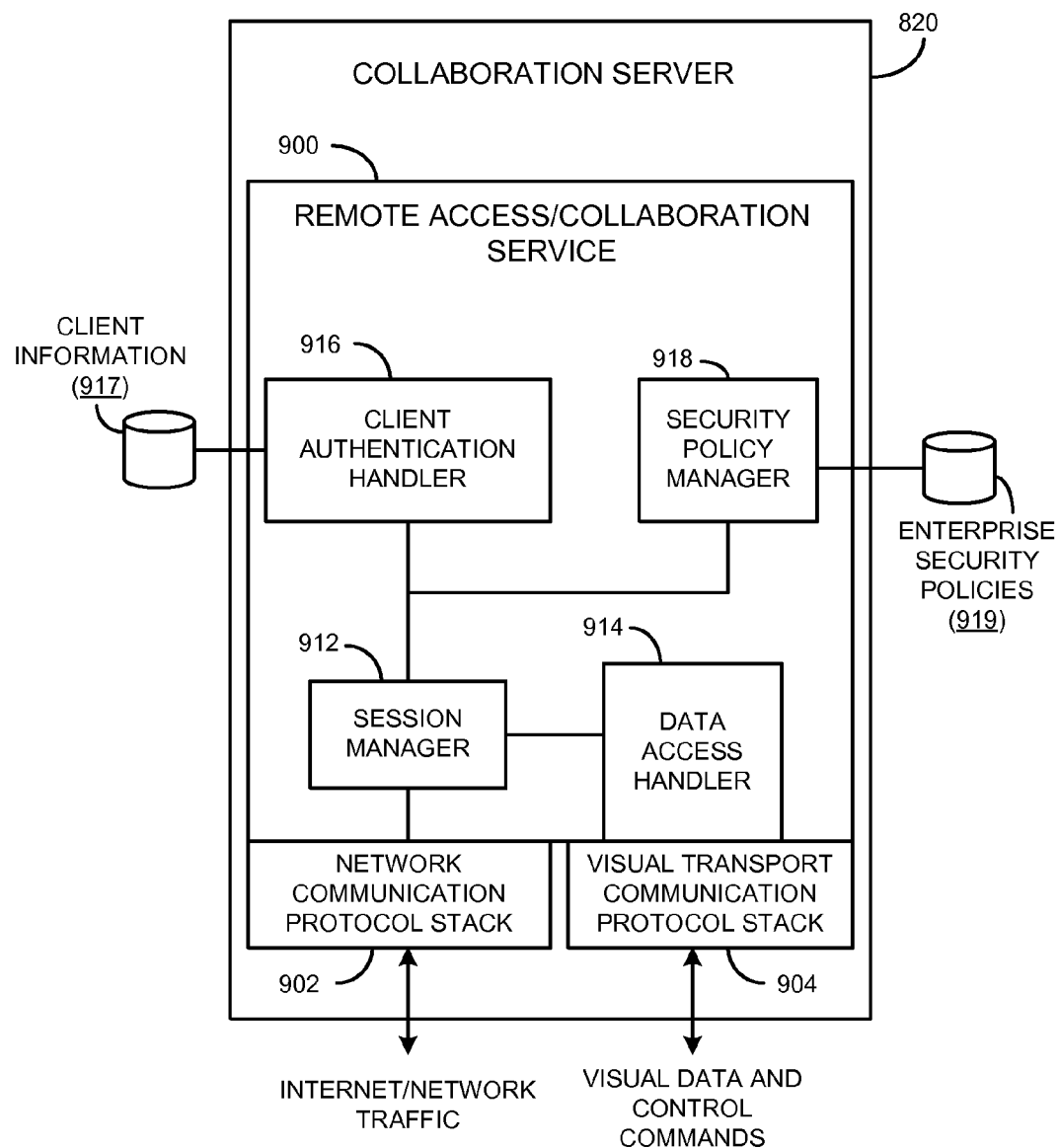
FIG. 9 is a block diagram illustrating an exemplary collaboration server that includes a remote access/collaboration service according to one embodiment.
Figure 10:
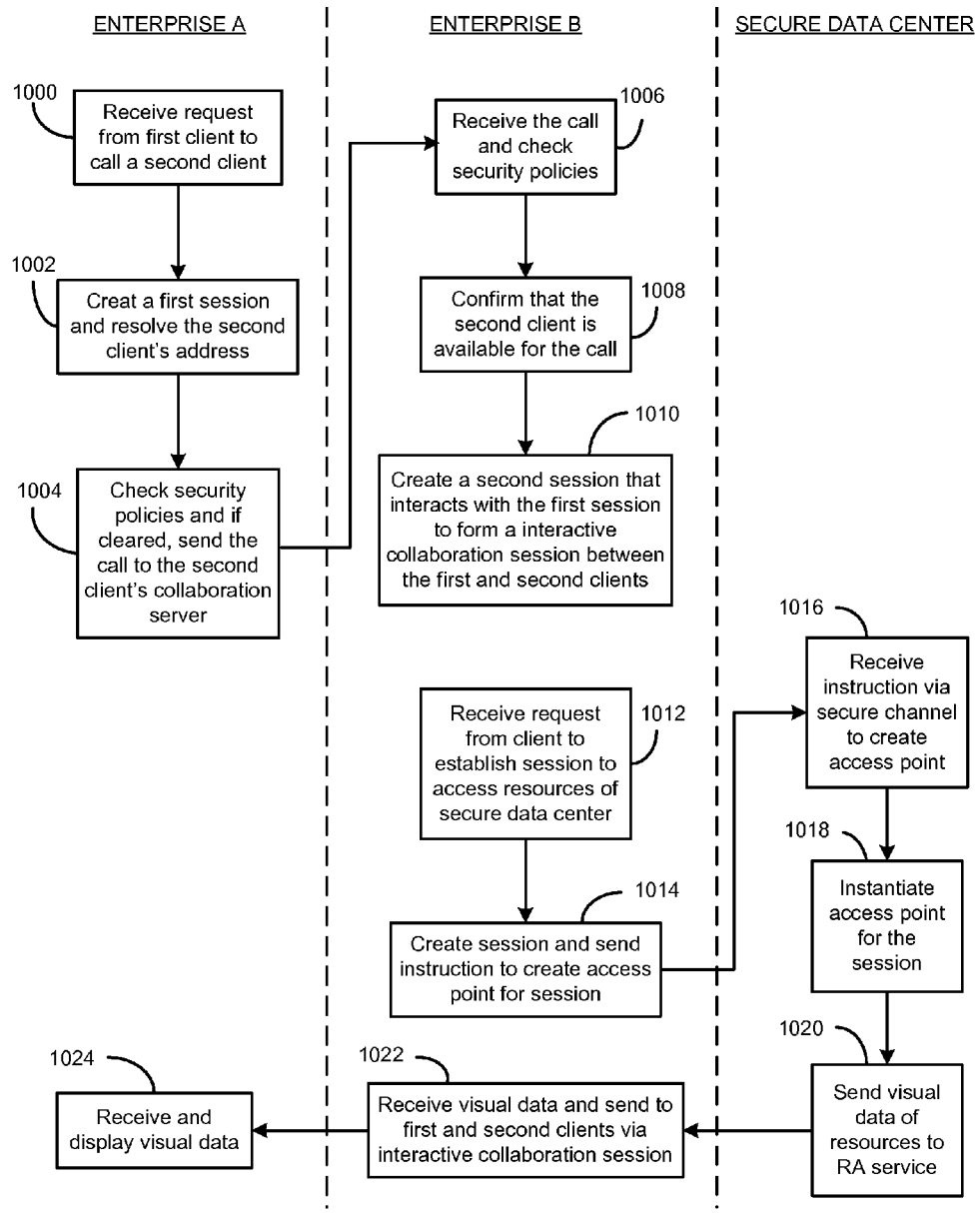
FIG. 10 is a flowchart illustrating an exemplary process for providing access to resources in a secure data center during a secure collaboration session between two clients according to one embodiment.

FIG. 9 is a block diagram illustrating an exemplary collaboration server 820b that includes a remote access/collaboration service 900, and FIG. 10 is a flowchart illustrating an exemplary process for forming a secure collaboration session between two clients 120a, 120b according to one embodiment. Referring to FIG. 8, FIG. 9, and FIG. 10, the exemplary process begins when the collaboration server, e.g., 820a, for a first client in Enterprise A, receives a request to call a second client 120b inviting the second client 120b to engage in a collaboration session (block 1000). In this example, the second client 120b is registered on a collaboration server 820b in Enterprise B. Accordingly, the first and second clients 120a, 120b reside in different networks 810a, 810b.

In one embodiment, the call identifies, among other things, the second client 120b, referred to as "the invitee," and an address associated with the invitee 120b. In one version, the call can include such information as:
 Invitee ID
 ID of invitee's collaboration server
 Inviter ID
 ID of inviter's collaboration server
 Security information (e.g. security key index, encryption scheme).

In one embodiment, each client 120a, 120b in the system 800 can be assigned a collaboration session address that is compatible with and similar to existing electronic mail addresses. The collaboration session address can be used to identify the client 120a, 120b for the purpose of establishing a collaboration session, and can include, for example, a user name associated with the client 120a, 120b and a domain ID associated with the collaboration network 810a, 810b in which the client 120a, 120b resides. The domain ID can be resolved, via a DNS, into an IP address for the collaboration server 820b associated with the network 810b.

When the request is received, the first client's collaboration server 820a processes the request. For example, referring to FIG. 9, a session manager component 912 in the remote access/collaboration (RAC) service 900 receives the request and authenticates the first client 120a using, in one embodiment, the client authentication handler component 916 described earlier. When the first client 120a is authenticated, the session manager 912 can create a first session including the first client 120a, and resolves the second client's collaboration session address into an IP address so that the call can be sent to the second client 120b (block 1002).

Prior to sending the call, the session manager 912 can perform a security check using the security policy manager component 918 described earlier (block 1004) to ensure compliance with security policies for Enterprise A. For example, the security policy manager 918 can determine whether a collaboration session involving Enterprise B is allowed. When no policies are violated, the call is sent over the Internet 110 to the RAC service 900 in the second client's collaboration server 820b (block 1004).

The RAC service 900 in the collaboration server 820b for the second client 120b receives the call and uses its security policy manager component 918 to perform a security check (step 1006) to ensure compliance with security policies for Enterprise B. The security check can apply at a hub level and/or at an application level. If at any time a security policy is violated, the call will be denied and/or a message can be returned to the inviter indicating why a collaboration session cannot be established.

If the security manager component 918 clears the call, the RAC service 900 can confirm whether the second client 120b wants to accept the call by, for example, checking the presence information associated with the second client 120b to determine whether the second client 120b is available to accept the call and/or checking the second client's permission rules stored in the client information data store 917 (block 1008). If the second client 120b accepts the call, the session manager component 912 in the RAC service 900 in the second client's collaboration server 820b creates a second session that interacts with the first session created in the first client's network 810a to form an interactive collaboration session between the first and second clients 120a, 120b (block 1010). In this embodiment, the interactive collaboration session is secure and supports real-time data exchanges across two domains.

Once the secure interactive collaboration session is formed between the two clients 120a, 120b, several data communication channels can be established for different applications (e.g. text message, application sharing, audio, and video). In one embodiment, all data can travel through one or both collaboration servers 820a, 820b. The two clients 120a, 120b on the call can share applications, annotate work and communicate via chat or voice simultaneously. All data sent between the servers 820a, 820b can be encrypted using a method and keys determined when the interactive collaboration session is formed.

When one or both clients 120a, 120b require access to secure resources 154 in the secure data center 150, the RAC service 900 in the collaboration server 820b associated with the secure data base 150 receives a request from a client, e.g., the second client 120b, to establish a session for accessing secure resources 154 in the secure data center 150 (block 1012). Presumably, the secure data transport channel 250 has already been established between the visual access service 500 in the internal access server 200 in the secure data center 150 and the RAC service 900 in the collaboration server 820b in the manner described above and shown in blocks 400 through 406 of FIG. 4.

According to one embodiment, the session manager component 912 in the RAC service 900 processes the request by authenticating the requesting client 120b and determining whether the requesting client 120b is authorized to access the secure resources 154. When the requesting client 120b is authenticated and authorized, the session manager component 912 can, in one embodiment, create the session and direct the data access handler component 914 to send an instruction to the visual access service 500 to create a data access point for the session associated with the requesting client 120b (block 1014).

According to an exemplary embodiment, the visual access service 500 in the internal access server 200 receives the instruction from the RAC service 900 (block 1016) via the secure data transport channel 250 and instantiates a data access point for the session (block 1018). Once the data access point is instantiated, visual data corresponding to the resources 154 to which the requesting client 120b is authorized to access is sent from the data access point to the RAC service 900 via the secure data transport channel 250 (block 1020). The visual data is received by the RAC service 900 and sent to the requesting client 120b where it is received and displayed on the requesting client 120b to the user.

In this example, because the second client 120b and the secure data center 150 are affiliated with Enterprise B, the second client 120b most likely is authorized to access the resources 154. The first client 120a, however, is not affiliated with Enterprise B, and therefore, is unlikely to be authorized to access the resources 154. Accordingly, the session manager component 912 would probably deny such a request from the first client 120a. Nevertheless, because the first client 120a and the second client 120b are participants in an interactive collaboration session, the RAC service 900 can send the visual data displayed on the second client 120b to the first client 120a via the interactive collaboration session (block 1022), where it is received and displayed on the first client 120a to the user (block 1024). Accordingly, access to the secure resources 154 by all participants to an interactive collaboration session is possible when at least one of the participants, e.g., the second client 120b, is authorized to access the secure resource 154.

Through aspects of the embodiments described, remote access to resources in a secure data center 150 is provided using an internal access server 200 inside of the secure data center 150 and a remote access server 300 outside of the secure data center 150. It should be understood that the various components illustrated in the figures represent logical components that are configured to perform the functionality described herein and may be implemented in software, hardware, or a combination of the two. Moreover, some or all of these logical components may be combined and some may be omitted altogether while still achieving the functionality described herein.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any medium that can contain, store, communicate, propagate, or transport instructions for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a portable digital video disc (DVD), a wired network connection and associated transmission medium, such as an ETHERNET transmission system, and/or a wireless network connection and associated transmission medium, such as an IEEE 802.11 (a), (b), or (g) or a BLUETOOTH transmission system, a wide-area network (WAN), a local-area network (LAN), the Internet, and/or an intranet.

Thus, the subject matter described herein can be embodied in many different forms, and all such forms are contemplated to be within the scope of what is claimed.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for providing remote access to resources in a secure data center protected by at least one firewall, the method comprising:

sending by an internal server within the secure data center a request to an external server outside of the secure data center through the at least one firewall protecting the secure data center and at least one of a public network, a private network, and a second firewall, the request for establishing a secure data transport channel between the internal server and the external server;

receiving by the internal server a reply to the request from the external server, the reply granting the request and confirming the establishment of the secure data transport channel, wherein the secure data transport channel communicatively connects the internal server and the external server over at least one of the public network, the private network, and the second firewall and through the at least one firewall protecting the secure data center;

receiving by the internal server a first message from the external server via the established secure data transport channel, the first message including an instruction to create a first data access point associated with a first session;

in response to receiving the first message, instantiating the first data access point for the first session;

sending from the first data access point visual data corresponding to the resources in the secure data center to the external server via the secure data transport channel, wherein the visual data is received by the external server and then sent to a first client associated with the first session so that the first client is provided visual access to the resources in the secure data center while the resources remain protected within the secure data center;

receiving by the internal server a second message from the external server via the established secure data transport channel, the second message including a control command from the first client and associated with the first session, wherein the control command includes one or more mouse actions;

routing the control command to the first data access point for the first session;

processing the control command by the first data access point;

sending from the first data access point visual data corresponding to a result of the processing of the control command to the external server via the secure data transport channel, wherein the visual data is received by the external server and then sent to the first client;

at least one of recording the control command in a command log and recording the visual data corresponding to the result of the processing of the control command in a result log; and storing at least one of the command log and the result log for auditing purposes.

2. The method of claim 1 wherein processing the control command by the first data access point includes:

sending, by the first data access point, an instruction based on the control command to at least one resource identified in the second message via a secure internal network, wherein the secure internal network supports internal TCP/IP network traffic between the first data access point and the resources; and receiving, from the at least one identified resource, the result of the processing of the instruction via the secure internal network, wherein all internal TCP/IP network traffic received by the first data access point from the at least one identified resource terminates at the first data access point.

3. The method of claim 1 wherein prior to transmitting the request to establish the secure data transport channel, the method further includes:

identifying and locating the external server, wherein the external server is associated with the internal server.

4. The method of claim 1 further including:

receiving by the internal server a second message from the external server via the established secure data transport channel, the second message including an instruction to create a second data access point associated with a second session;

in response to receiving the second message, instantiating the second data access point for the second session; and transmitting from the second data access point visual data corresponding to the resources in the secure data center to the external server via the secure data transport channel, wherein the visual data is received by the external server and then sent to a second client associated with the second session so that the second client is provided visual access to the resources in the secure data center.

5. The method of claim 1 wherein instantiating the first data access point for the first session includes:

determining which resources a first client associated with the first session is authorized to access; and transmitting visual data corresponding to authorized resources in the secure data center to the external server via the secure data transport channel, wherein the resources include enterprise computer systems, applications, data bases, and network equipment.

6. A non-transitory computer readable medium containing a computer program, executable by a machine, for providing remote access to resources in a secure data center protected by at least one firewall, the computer program comprising executable instructions for:

sending by an internal server within the secure data center a request to an external server outside of the secure data center through the at least one firewall protecting the secure data center and at least one of a public network, a private network, and a second firewall, the request for establishing a secure data transport channel between the internal server and the external server;

receiving by the internal server a reply to the request from the external server, the reply granting the request and confirming the establishment of the secure data transport channel, wherein the secure data transport channel communicatively connects the internal server and the external server over at least one of the public network, the private network, and the second firewall and through the at least one firewall protecting the secure data center;

receiving by the internal server a first message from the external server via the established secure data transport channel, the first message including an instruction to create a first data access point associated with a first session;

instantiating the first data access point for the first session in response to receiving the first message;

sending from the first data access point visual data corresponding to the resources in the secure data center to the external server via the secure data transport channel, wherein the visual data is received by the external server and then sent to a first client associated with the first session so that the first client is provided visual access to the resources in the secure data center while the resources remain protected within the secure data center;

receiving by the internal server a second message from the external server via the established secure data transport channel, the second message including a control command from the first client and associated with the first session, wherein the control command includes one or more mouse actions;

routing the control command to the first data access point for the first session;

processing the control command by the first data access point;

sending from the first data access point visual data corresponding to a result of the processing of the control command to the external server via the secure data transport channel, wherein the visual data is received by the external server and then sent to the first client;

at least one of recording the control command in a command log and recording the visual data corresponding to the result of the processing of the control command in a result log; and storing at least one of the command log and the result log for auditing purposes.

7. The computer readable medium of claim 6 wherein the instructions for processing the control command by the first data access point include:

sending, by the first data access point, an instruction based on the control command to at least one resource identified in the second message via a secure internal network, wherein the secure internal network supports internal TCP/IP network traffic between the first data access point and the resources; and receiving, from the at least one identified resource, the result of the processing of the instruction via the secure internal network, wherein all internal TCP/IP network traffic received by the first data access point from the at least one identified resource terminates at the first data access point.

* * * * *